June 30, 1925.
W. H. LOVELL ET AL
TRUCK
Filed July 28, 1924
1,544,465
2 Sheets-Sheet 2
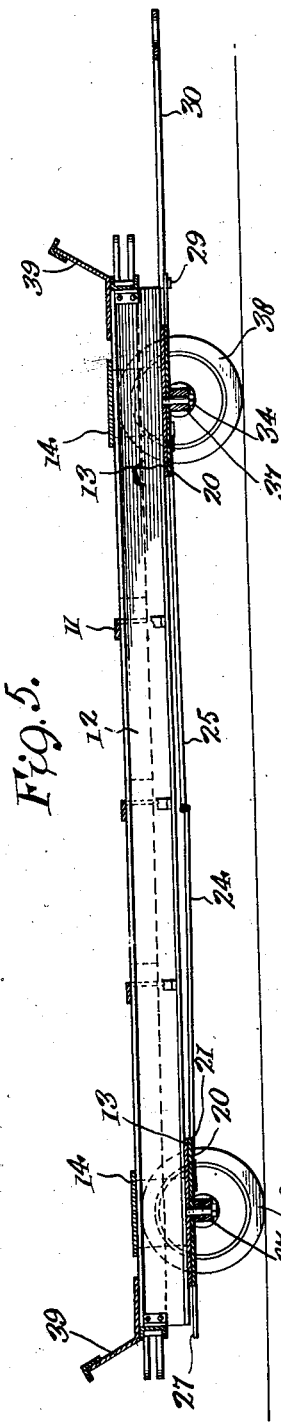
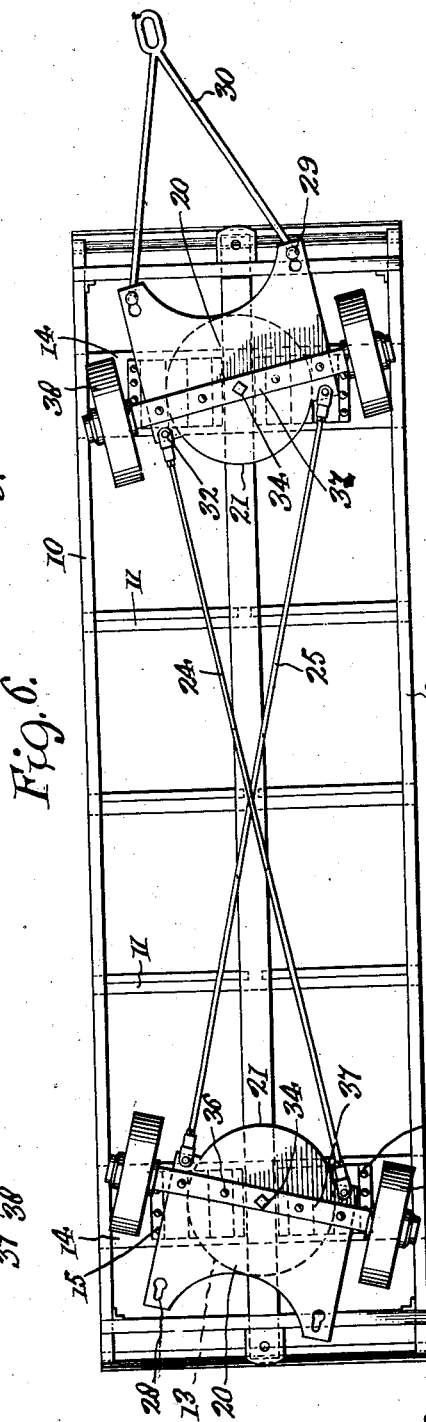
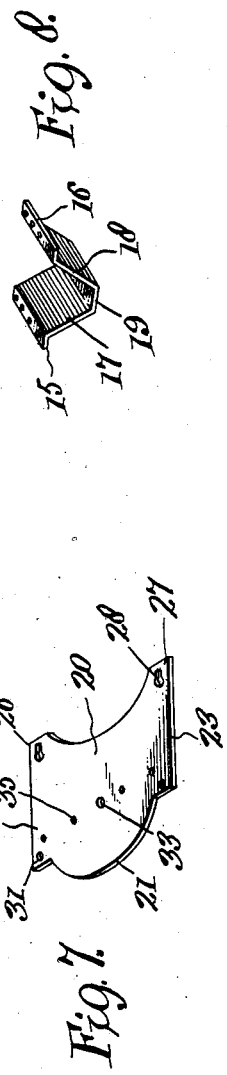
Inventors
W. H. Lovell and
M. W. Brown
by Wilkinson & Giusta
Attorneys.

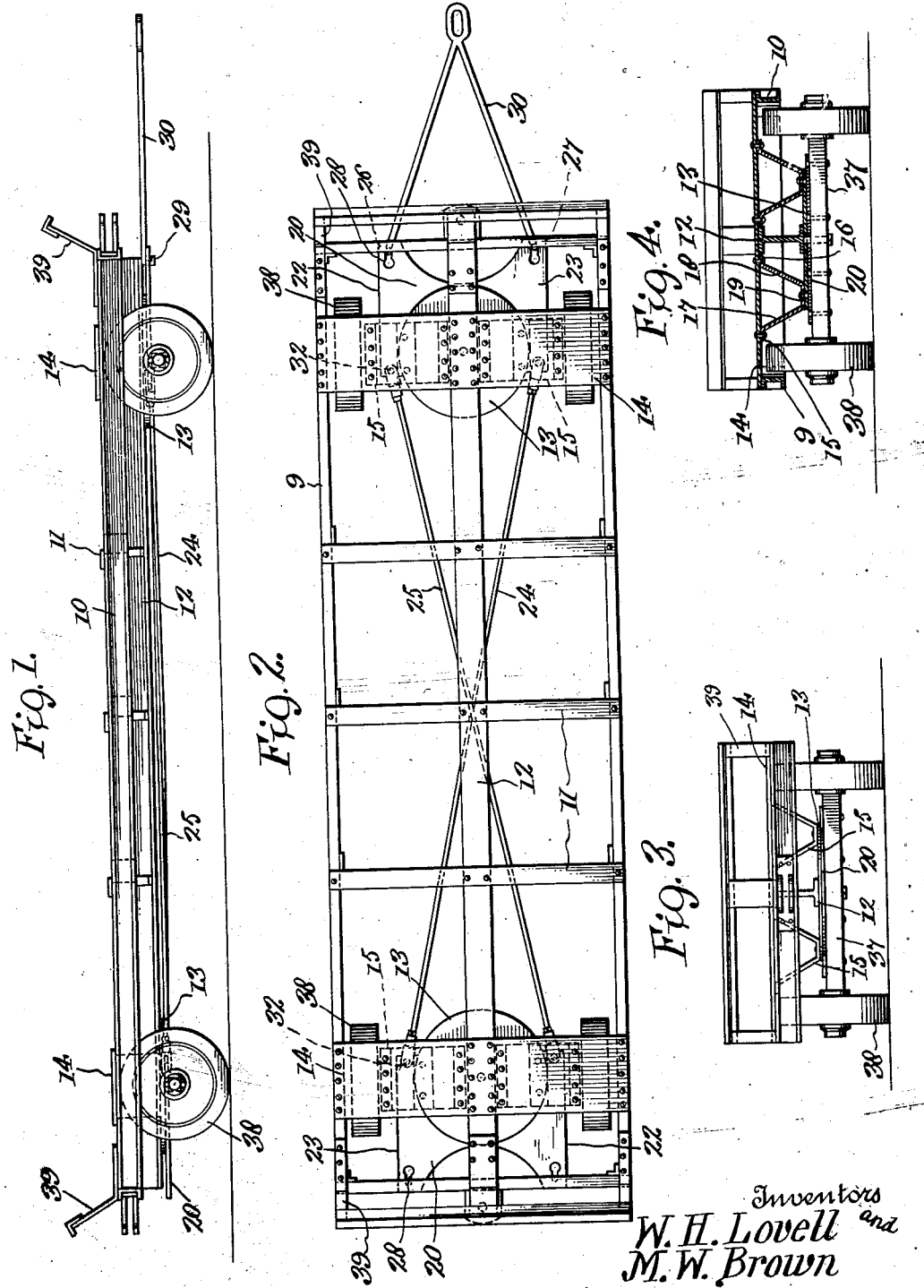

Patented June 30, 1925.

1,544,465

UNITED STATES PATENT OFFICE.

WILLIAM HERBERT LOVELL AND MARTIN WM. BROWN, OF GALVESTON, TEXAS, ASSIGNORS TO THE ATLAS ENGINEERING WORKS, OF GALVESTON, TEXAS, A CORPORATION OF TEXAS.

TRUCK.

Application filed July 28, 1924. Serial No. 728,742.

*To all whom it may concern:*

Be it known that we, WILLIAM H. LOVELL and MARTIN WM. BROWN, citizens of the United States, residing at Galveston, in the county of Galveston and State of Texas, have invented certain new and useful Improvements in Trucks; and we do hereby declare the following to be a full, clear, and exact description of the invention, such as will enable others skilled in the art to which it appertains to make and use the same.

The present invention relates to improvements in trucks, and has for an object to provide an improved truck adapted particularly to be hauled in trains by tractors in which the front and rear wheels are mounted for pivotal steering movement with connections between the same for coordinating this movement.

More specifically the object of the invention is to provide certain improved constructions in the pivotal support and mounting of the front and rear steering trucks of the trailer and in certain improvements in the connections and the method of coupling the connections to the front and rear trucks and in an improved construction for enabling the draw bar to be connected to either end of the truck and to be readily demounted while preserving the longitudinal thrust upon the trucks and taking it off the king bolts.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side view of the trailer as constructed in accordance with the present invention.

Figure 2 is a top plan view of the same.

Figure 3 is an end view.

Figure 4 is a cross section.

Figure 5 is a longitudinal section.

Figure 6 is a bottom plan view.

Figure 7 is a perspective view of the lower fifth wheel, and

Figure 8 is a similar view of one of the reinforcing plates for the upper fifth wheel.

Referring more particularly to the drawings the device consists of a body and front and rear steering trucks. The body is constructed in any appropriate manner being made up preferably of the longitudinal side rails 9 and 10 secured in parallel spaced relation by the transverse beams 11. The side beams 9 and 10 are preferably relatively small channel beams while the cross beams 11 are flat beams secured to the upper flanges of the channel beams as by rivets or otherwise.

The frame is reinforced centrally and longitudinally by the enlarged eye beam 12 which also receives the cross beams 11 to which it is bolted, riveted or otherwise fastened and the I beam assists to support the upper fifth wheels 13 near each end of the body. Just above the trucks are relatively wide plates 14 extending transversely and riveted both to the side channel beams and to the I beam and forming an appropriate support to which to rivet or otherwise attach the flanges 15 of the V-shaped supports for the upper fifth wheel 13.

These V-shaped supports are shown in Figure 8, the flanges being provided with holes 16 in which to receive the rivets by which the attachment is made to the plate 14. The flanges are shown to be of extended length and to have four holes so that an adequate number of fastenings over an extended area may be used to secure the parts as the trailer is of very great load capacity. The walls 17 and 18 of the supports converge downwardly and join with the substantially horizontal web 19 which rests upon the fifth wheel 13 and is also provided with a number of holes in which to receive rivets or other fastenings also passing through the fifth wheel and being flush with the lower surface of the fifth wheel to permit the lower fifth wheel to turn upon said upper fifth wheel.

The supports are shown to be two in number for each upper fifth wheel, and to be located in transverse alinement, one to each side of the center I beam 12. The upper fifth wheel being also at diametrically opposite points in contact with the lower flange of the I beam and if desired it may be also secured appropriately to this lower flange of the I beam.

The lower fifth wheel is represented at 20 and is shown to advantage in Figure 7. This fifth wheel is of sufficient intermediate area to contact throughout with the lower surface of the upper fifth wheel as indicated in Figure 6, and it is for this purpose provided at one side with the rounded extension 21. The lower fifth wheel is also provided with lateral wings 22 and 23 which extend beyond the perimeter of the upper fifth wheel in order to receive the cross connecting rods 24 and 25 by which the front and rear trucks are coupled together for simultaneous steering or pivotal movement.

The wings at their outer ends merge into the horns 26 and 27 which are provided with key slots 28 in order to receive and lock therein the headed ends 29 of the forked draw bar 30 by which the trailers are coupled together and to the tractor. The wings 22 and 23 are at their inner ends provided with perforations 31 to receive the fastenings by which the clips 32 upon the ends of the rods 24 and 25 are made fast to the lower fifth wheels. A central large opening 33 is made in each plate to receive the king bolt 34 and laterally alining openings 35 in the plate are provided to receive the fastenings 36 by which the bolster or axle 37 is secured to the lower fifth wheel. The wheels are indicated at 38.

In the use of the device the trailer is a flat relatively low structure and provided with sills 39 upstanding at an inclination from its ends in order to effectively hold the bales of cotton or other goods during transportation. A number of the trailers are connected together by the draw bars and a tractor is used to haul the train. When the front truck is turned to steer the same it rotates together with the lower fifth wheel about the king bolt and by reason of the rods 24 and 25, the rear truck is caused to undergo a complemental movement pivoting in the opposite direction whereby to cause a short turning movement. The draw bars may be readily disconnected and coupled to either end at a point just beneath the truck end where the key slots are accessible and the drawing strains will be absorbed by the lower fifth wheel and by contact with the surface of the upper fifth wheel and the draft strain will also be absorbed in the rods 24 and 25 and in the rear truck, so that there will be no tendency to pull out or distort the front king bolt.

Moreover the strain is taken up by the V-shaped supports for the upper fifth wheel and the construction is found in actual use to be an extraordinary staunch and vigorous one for use in hauling where breakage of parts and consequent high operating costs are common.

It is obvious that various changes and modifications may be made in the details of construction and design of the above specifically described embodiment of this invention without departing from the spirit thereof, such changes and modifications being restricted only by the scope of the following claims.

What is claimed is:—

1. A trailer comprising a body having a central longitudinal beam, plates extending across said frame near the ends thereof, supports secured to said plates at opposite sides of said central beam, an upper fifth wheel secured to said supports, a lower fifth wheel pivoting about said upper fifth wheel, a wheeled truck secured to said lower fifth wheel, means for connecting the lower fifth wheels of both trucks of the trailer, and a draw bar for detachable mounting in connection with either lower fifth wheel of the trailer.

2. A trailer comprising a body having a central longitudinal beam, plates extending across said frame near the ends thereof, substantially V-shaped supports having flanges secured beneath said plates at opposite sides of said central beam, an upper fifth wheel secured to said supports, a lower fifth wheel pivoting about said upper fifth wheel, a wheeled truck secured to said lower fifth wheel, and means for connecting the lower fifth wheels of both trucks of the trailer.

3. A trailer comprising a body including a central longitudinal beam, plates extending across said body near the ends thereof, supports attached to said plates and extending downwardly at opposite sides of said longitudinal beam, an upper fifth wheel secured to the lower parts of said supports, a lower fifth wheel pivoting about said upper fifth wheel and having lateral wings and horns extending toward the ends of the truck from said lateral wings, a wheeled truck secured to said lower fifth wheel, rods for connecting opposite wings of the front and rear lower fifth wheels of the trailer, and a draw bar for detachable connection with the horns of either lower fifth wheel of the trailer.

4. A trailer comprising a body, said body composed of side rails and cross beams and a central longitudinal enlarged beam, plates extending across said body near the ends thereof, V-shaped supports having flanges secured to said plates, said supports being at opposite sides of said central beam, an upper fifth wheel secured to said supports, a lower fifth wheel pivoting about said upper fifth wheel, a wheeled truck secured to said lower fifth wheel, means for connecting the lower fifth wheels of both trucks of the trailer, and a draw bar for detachable mounting in connection with either lower fifth wheel of the trailer.

MARTIN WM. BROWN.
WILLIAM HERBERT LOVELL.